United States Patent
Mangano et al.

(10) Patent No.: US 7,231,764 B2
(45) Date of Patent: Jun. 19, 2007

(54) EXCHANGE AND/OR SCAVENGING DEVICE FOR A CIRCUIT COMPRISING AT LEAST ONE HYDRAULIC MOTOR

(75) Inventors: Alain Mangano, Vieux Moulin (FR); Jean-Philippe Raisin, Gouvieux (FR)

(73) Assignee: Poclain Hydraulics Industrie, Verberie (FR)

( * ) Notice: Subject to any disclaimer, the term of this patent is extended or adjusted under 35 U.S.C. 154(b) by 202 days.

(21) Appl. No.: 10/533,095

(22) PCT Filed: Oct. 28, 2003

(86) PCT No.: PCT/FR03/03199

§ 371 (c)(1),
(2), (4) Date: Apr. 27, 2005

(87) PCT Pub. No.: WO2004/040147

PCT Pub. Date: May 13, 2004

(65) Prior Publication Data

US 2006/0053784 A1 Mar. 16, 2006

(30) Foreign Application Priority Data

Oct. 28, 2002 (FR) .................................. 02 13438

(51) Int. Cl.
*F16D 31/02* (2006.01)
(52) U.S. Cl. .......................... 60/464; 60/329

(58) Field of Classification Search .................. 60/329, 60/464, 468
See application file for complete search history.

(56) References Cited

U.S. PATENT DOCUMENTS

| 3,561,214 | A | * | 2/1971 | Bobst ........................... 60/430 |
| 4,354,351 | A | | 10/1982 | Dezelan |
| 6,336,325 | B1 | | 1/2002 | Gluck et al. |
| 6,339,928 | B1 | | 1/2002 | Gollner |

FOREIGN PATENT DOCUMENTS

DE 196 51 988 A1 6/1997

* cited by examiner

*Primary Examiner*—Michael Leslie
(74) *Attorney, Agent, or Firm*—Ladas & Parry LLP

(57) ABSTRACT

The device comprises a replenishing valve (24) having an opening control chamber suitable for being connected to a main duct (12, 14) of the circuit, and a closing control chamber, the pressure in said chambers making it possible to cause the moving member of the replenishing valve to move so as either to connect or not to connect the main duct to which said valve is connected to a pressure-free reservoir. The device further comprises a control valve (46) which is controlled as a function of at least one control parameter representing a state of the circuit other than pressure in said main duct to which said replenishing valve (24) is connected, in order to connect the closing control chamber to the pressure-free reservoir or in order to isolate said chamber from said reservoir.

20 Claims, 4 Drawing Sheets

EXCHANGE AND/OR SCAVENGING DEVICE FOR A CIRCUIT COMPRISING AT LEAST ONE HYDRAULIC MOTOR

The present invention relates to a replenishing and/or flushing device for a circuit including at least one hydraulic motor having a casing which defines an internal space in which the cylinder block of the motor is disposed, and two main ducts which are connected to a main pump and which constitute respectively a feed main duct and a discharge main duct for said hydraulic motor, the device comprising a replenishing valve connected to at least one of the main ducts and suitable for taking up an open configuration in which it establishes a link between said main duct to which it is connected and a pressure-free reservoir, and a closed configuration in which it prevents such a link from being established.

Such a replenishing device serves to tap fluid from the main circuit in order to enable the fluid to be cooled before being removed towards a pressure-free reservoir and being re-injected into the circuit. With a flushing device, the tapped fluid goes via the casing of the motor and/or via the casing of the main pump before being removed to the pressure-free reservoir and being put back into circulation, in general by an auxiliary pump.

Known replenishing devices have a selector that makes it possible put the main duct that is at the lower pressure into communication with a valve that allows fluid to be removed only from a pressure threshold. In certain devices, the flow rate of tapped fluid can be limited.

For example, Document DE-195 22 448 shows a replenishing device having a replenishing selector and a valve disposed in succession in the replenishing circuit.

Document U.S. Pat. No. 6,339,928 discloses a replenishing device for a closed circuit, that device comprising a selector of the above-mentioned type and a replenishing valve that is controlled so as to allow or prevent fluid removal certain operating conditions. For that purpose, that replenishing valve is controlled as a function of operating parameters such as the speed of the vehicle driven by the hydraulic motor, the speed of revolution of an engine that drives the main pump, and the temperature of the fluid in that pump.

The replenishing valve of the device of U.S. Pat. No. 6,339,928 is under all-electric control, implemented by a processor which, on the basis of parameters representative of a state of the circuit, determines control orders.

In a large number of cases, it remains advantageous to take account of the pressure in the main duct to which the replenishing valve is connected, in order to allow replenishing to take place or in order prevent replenishing from taking place. For example, that applies when the flow-rate of fluid delivered by the replenishing fluid source becomes low, because the replenishing flow rate might then give rise to such a drop in the pressure in the main duct to which the replenishing valve is connected that it is not possible to boost the motor.

The device of U.S. Pat. No. 6,339,928 can take account of that pressure only if pressure sensors are disposed in the two main ducts or at the outlet of a selector connected to said ducts, so that the pressures measured by said sensors are used by the processor while implementing its control.

Thus, a certain number of electronic components are necessary, which increases the cost of the device. In addition, the all-electric control is not always best suited when, as applies in that case, the control orders are applied to hydraulic components that modify the hydraulic state of the circuit on opening or closing.

An object of the present invention is to remedy the drawbacks of the above-mentioned prior art by making it possible, for replenishing, to take account of the pressure in the duct to which the replenishing valve is connected by means of a hydraulic control, in addition to taking account of a parameter other than said pressure.

The device of the invention achieves this object by the facts that: the replenishing valve includes a moving member mounted to move between a first position and a second position respectively corresponding to the closed configuration and to the open configuration of the replenishing valve; the device further comprises a control valve which is controlled as a function of said at least one control parameter to allow said moving member to move; said device further comprises an opening control chamber suitable for being connected to one of said main ducts via a first link duct so as to urge the moving member towards its second position in which said main duct is connected to the pressure-free reservoir, and a closing control chamber suitable for being connected to a pressurized enclosure in order to urge the moving member towards its first position; and the control valve is controlled as a function of said at least one control parameter in order to connect said closing control chamber to the pressure-free reservoir or in order to isolate said chamber from said reservoir.

With the invention, it is the control valve that is controlled by the parameter other than the pressure in the duct to which the replenishing valve is connected, whereas, by appropriately disposing the opening and closing control chambers of the replenishing valve, said replenishing valve is controlled by the pressure in the main duct to which it is connected.

Replenishing may not be desirable under certain particular conditions, e.g. on starting up the hydraulic motor.

By tapping a flow rate of fluid for replenishing purposes, the circuit might be deprived of a quantity of fluid necessary for driving other auxiliary functions, such as releasing the parking brake. Thus, tapping a replenishing flow rate can cause the pressure to drop and prevent some other function from being driven.

In addition, when the device has a replenishing selector with a slide, it is possible, when the fluid is cold and has high viscosity, that the slide might move too slowly to enable the main duct that is at the lower pressure to be put into communication with the replenishing valve. If the pressure in the ducts is reversed, the slide can remain momentarily in the position it had before the reversal, and thus put the main duct that was previously at the lower pressure and that is then at the higher pressure into communication with the replenishing valve, thereby depriving the motor of some of its power.

When the value of said at least one control parameter indicates that replenishing is not desirable, the control valve is caused to isolate the closing control chamber from the reservoir. Due to such isolation, the pressure in the closing control chamber can be such that the pressure in the opening control chamber that is connected to one of the main ducts is not high enough to cause the replenishing valve to open.

This makes it possible to avoid fluid being tapped from the main duct by the replenishing device under unfavorable conditions, reflected by said control parameter. As explained below, such unfavorable conditions may be a cold start for the motor, or else particular operating stages such as acceleration, deceleration, maneuvering requiring full motor power, etc. Below, the parameter other than the pressure of fluid in the main duct is referred to as the "first control parameter". It should be noted that, under such unfavorable conditions under which replenishing is not desirable, the pressure in the closing chamber of the replenishing valve is such that it prevents leakage between the inlet of the replenishing valve and the reservoir.

Conversely, when such unfavorable conditions are no longer observed, i.e. when the state of the circuit theoretically allows the replenishing to take place, the control valve connects the closing control chamber to the reservoir, and the replenishing valve performs the replenishing when the pressure in the main duct to which it is connected so permits.

Advantageously, the first control parameter representing a state of the circuit is chosen from pressure of the fluid in an auxiliary duct of the circuit (e.g. the boost pressure), temperature of the fluid in a region of the circuit, speed of the rotor of the motor, acceleration or deceleration of said rotor, and active cubic capacity of the motor.

It may also be chosen from the turning angle of a vehicle driven by the hydraulic motor, from use of the flow rate delivered by an auxiliary pump for controlling auxiliary equipment, from its direction of drive, and from a braking situation, etc.

The first control parameter may be of any type, provided that its value is representative of a state of the circuit that makes it possible to condition actuation of the replenishing device.

Advantageously, the device is provided with an actuator suitable for controlling the control valve as a function of a threshold of the first control parameter.

For example, when the first control parameter reaches the threshold, the actuator allows the control valve to connect the closing control chamber to the pressure-free reservoir, then enabling the replenishing to be performed by the replenishing valve controlled hydraulically by the pressure in the main duct to which it is connected. Advantageously, the device is provided with a replenishing selector suitable for putting the main duct that is at the lower pressure into communication with the replenishing valve.

Thus, in known manner, the selector makes it possible to connect the replenishing valve to the duct that is at the lower pressure. However, the invention also applies to a replenishing device that is not provided with such a selector, and in particular that is of the type described in French Patent Application No. 2 819 023.

The replenishing valve may be a non-progressive selector having two positions, in which case the flow rate of fluid tapped in its open position is limited by a constriction. However, it is advantageously a progressive valve such as a pressure limiter or valve that makes it possible to regulate the pressure in the duct to which it is connected regardless of the flow rate.

In an advantageous embodiment, the replenishing valve has a valve body provided with an inlet connected to one of the main ducts and with an outlet suitable for being connected to the pressure-free reservoir, and a moving member mounted to move between a first position and a second position corresponding respectively to the closed configuration and to the open configuration of said replenishing valve, said moving member isolating the inlet from the outlet in its first position, and connecting said inlet to said outlet in its second position.

Advantageously, the closing control chamber is associated with replenishing resilient return means continuously urging the moving member towards its first position.

Advantageously, the opening control chamber is situated at an end of the moving member that is in the vicinity of the inlet of the valve body, while the closing control chamber is situated at the other end of said moving member and communicates with the opening control chamber via a bore in the moving member.

The valve body is advantageously disposed in a bore in the casing.

Thus, the replenishing valve is advantageously incorporated into a cartridge which is fastened directly to the casing of the motor, making it possible, starting from a standard motor structure, to choose the most suitable replenishing and flushing mode, merely by modifying the cartridge.

In addition, when the control valve is disposed at least in part in the valve body of the replenishing valve, the first control parameter can be related directly to a state of the motor, such as the temperature thereof, the temperature of the fluid passing through said motor, the cubic capacity of said motor, etc.

Thus in order to adapt the circuit to the type of control considered, it suffices to choose a replenishing valve/control valve assembly (incorporated in a common hydraulic component forming the above-mentioned cartridge) and to insert it into the casing of the motor that is chosen. The range of motors proposed is thus broadened considerably starting from a small number of types of motor and of replenishing devices.

Advantageously, the outlet of the replenishing valve is connected to the pressure-free reservoir via the internal space inside the casing.

In this configuration, the fluid tapped for replenishing purposes is used to flush the internal space of the motor. The fluid tapped by the replenishing valve is injected into the casing, while the fluid present in the casing is removed via the usual leakage return orifice.

Advantageously, the control valve is a progressive valve.

The flow-rate of fluid tapped for replenishing purposes can thus vary as a function of the situation of the circuit, in particular as a function of the variation of the first control parameter.

The invention will be well understood and its advantages will appear more clearly on reading the following detailed description of embodiments given by way of non-limiting example.

The description is given with reference to the accompanying drawings, in which:

FIG. 1 diagrammatically shows a drive circuit for driving a hydraulic motor, which circuit includes a replenishing device of the invention;

Figure 1:
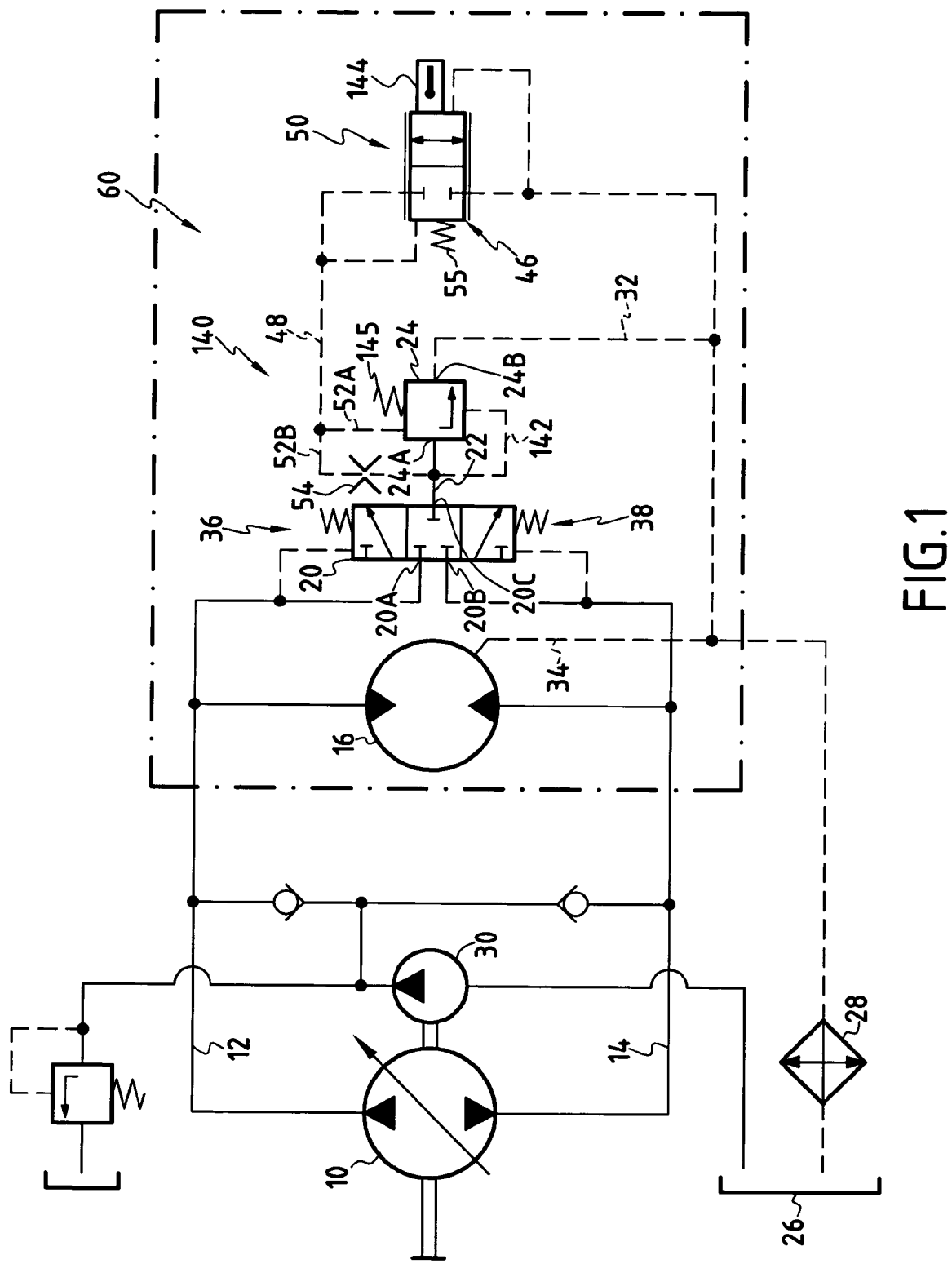

FIG. 1 shows a closed circuit whose main pump 10 has its orifices connected to respective ones of two main ducts 12 and 14 which serve respectively as a feed duct and as a discharge duct for a hydraulic motor 16 to which they are connected.

The circuit further includes a replenishing device that comprises a replenishing selector 20 which has two inlet ports 20A and 20B connected to respective ones of two main ducts 12 and 14, and one outlet port 20C which, via a duct 22 removes the fluid tapped by the selector 20 towards the inlet 24A of a replenishing valve 24 suitable, when its inlet is connected to its outlet 24B, for connecting the outlet 20C of the selector 20 to a pressure-free reservoir 26 via a cooler 28. Thus, under given operating conditions, the fluid tapped by the selector 20 is cooled before being re-injected into the main circuit by a booster pump 30. The reservoir is said to be "pressure-free" because it is at atmospheric pressure or at a very low pressure, at the most equal to the boost pressure.

The outlet 24B of the replenishing valve 25 can be connected directly to the pressure-free reservoir 26 by an outlet duct 32 so as to serve for replenishing only, or else it can be connected to said reservoir 26 via the internal space inside the motor 16, so as also to serve to flush said internal space, as shown in FIG. 1, before being removed towards said reservoir via the leakage return duct of the motor 34. In which case, the device is referred to as a "flushing" device. Apart from the above-mentioned differences, the two types of device operate in the same manner, and in the remainder of the description below, only a replenishing device is described. The motor 16 is not represented in detail, but, for example, it can be radial-piston motor of the same type as the motor described in FR-A-2 673 684.

The replenishing selector 20 is controlled by control means 36 and 38 to go from its neutral position shown in FIG. 1, and in which no communication is established between the main ducts 12 and 15 and the duct 22, to either one of its two replenishing positions in which it connects the main duct 12 or 14 that is at the lower pressure to the duct 22.

The replenishing valve 24 is controlled by means of a control valve 46 which, as shown in FIG. 1, is disposed between a link duct 48 and the leakage return 34 of the motor.

The replenishing valve 24 has a moving member mounted to move between a first and a second position, corresponding respectively to the closed position and to the open position of said valve. The replenishing valve 24 is a pressure limiter or valve whose moving member is the valve member or the slide. Said moving member is referred to below as the "slide".

The control means 60 for controlling said replenishing valve 24 comprise the control valve 46 and means 140 for causing the slide to move, when such movement is made possible by the state of the control valve 46.

The control means 140 for controlling the slide that are shown in FIG. 2 are hydraulic control means and they comprise a link duct 142 that is connected to the duct 22, and that opens out on one side of the slide into an opening control chamber (not shown in FIG. 1), so that the fluid pressure in the link duct 142 tends to push said slide towards its open position. The control means 140 further comprises return means for returning the slide to its closed position, which means comprise, in this example, a spring 145 and a link duct 52A connected to the duct 22 via a constriction 54, and opening out on one side of the slide into a closing control chamber (not shown in FIG. 1) so that the fluid pressure in the duct 52A and the spring 145 tend to push said moving member towards its closed position, against the force exerted by the fluid pressure in the link duct 142.

Thus, the fluid pressure in the main duct 12 or 14 that is at the lower pressure (to which the inlet of the replenishing valve 24 is connected) is taken into account in controlling said valve.

The constriction 54 is disposed on the link segment 52B that links the link duct 52A to the duct 22, so as to establish head loss between the duct 22 and the closing control chamber which is fed via the link duct 52A.

In the example shown, the opening and closing control chambers of the replenishing valve are connected to the same main duct because they are both connected to the duct 22. It can be imagined that the opening control chamber can remain connected to the main duct to which the inlet of the replenishing valve is connected, while the closing control chamber is connected to another enclosure under pressure, e.g. to an auxiliary pressure source such as a booster pump.

The control valve 46 is controlled by control means 50 to go between an open configuration in which it allows fluid coming from the link duct 52A and therefore from the closing control chamber of the replenishing valve 24 to flow towards the pressure-free reservoir 26, and a closed configuration in which it isolates said chamber from said reservoir 26.

The control means 50 have a control 144 of any suitable type (hydraulic, electrical, pneumatic, thermal, mechanical, etc.) which is actuated as a function of a first parameter P representing a state of the circuit in order to drive the control valve 46 to go between its closed position and its open position.

Said first parameter P represents a state of the circuit and its value indicates whether the replenishing can take place or whether it is preferable to avoid tapping fluid to perform the replenishing, in order to preserve the quantity of fluid and the pressure of fluid in the circuit, and thus in order to guarantee that it operates properly. For example, said first parameter P is chosen to represent a cold-start situation for the motor, or else particular operating stages, such as acceleration, deceleration, maneuvering requiring full motor power, etc. Therefore, the first control parameter can be chosen from the pressure of fluid in an auxiliary duct of the circuit, from the temperature of fluid in a region of the circuit, from the speed of the rotor of the motor, from acceleration or deceleration of said rotor, and from the active cubic capacity of the motor, etc.

For example, the control valve 46 may be a solenoid valve controlled by an electronic control unit that gives an opening or a closing instruction as a function of the detected value of the first control parameter P, as transmitted to said unit and compared with a reference value.

The valve 46 advantageously has a moving member, such as a slide which is suitable for moving between two positions, corresponding respectively to the open configuration and to the closed configuration of said valve 46, the moving member being caused to move as a function of the first control parameter P.

In this example, the control 144 shown in FIG. 1 for the control valve 46 is an actuator that is suitable for moving the moving member of the control valve 46 as a function of temperature.

The control valve 46 is brought into its open position by the actuator 144, while it is brought into its closure position by control resilient return means, constituted by a spring 55 in this example, whose forces are added to those forces which result from the fluid pressure coming from the link duct 48 that is connected to the link duct 52A.

A description follows of how the replenishing valve 24 operates, which, as explained above, depends firstly on the pressure in the main duct 12 or 14 to which it is connected and secondly on the first control parameter P which is suitable for actuating the control valve 46.

When the control valve 46 is in the closed position, it does not allow the fluid coming from the ducts 52A and 52B, and from the closing control chamber, to flow towards the pressure-free reservoir 26, so that the pressure in the link duct 52A (and all the more so in the closing control chamber) is equal to the pressure in the duct 22 and in the duct 142, regardless of the level of pressure in the duct 22.

Therefore, the return forces due to the spring 145, combined with the pressure of fluid in the link duct 52A, are then greater than the forces exerted by the pressure of the fluid contained in the link duct 142, so that the replenishing valve 24 is positioned in its closed position, thereby preventing removal of a replenishing flow towards the pressure-free reservoir 26, as shown in FIG. 1.

Conversely, when the control valve 46 is in the open position, it allows the fluid coming from the link duct 52A and from the closing control chamber to be discharged towards the pressure-free reservoir 26, so that the fluid pressure in the link duct 52A (and all the more so in the closing control chamber) is, due to the presence of the constriction 54, lower than the pressure of the fluid contained in the link duct 142 (and all the more so in the opening control chamber). Therefore, when the pressure of the fluid in the link duct 142 is greater than a threshold value that generates a force greater than the force of the spring 145, the replenishing valve 24 is positioned in its open configuration, thereby allowing a replenishing flow towards the pressure-free reservoir 26 by forming a link between the duct 22 and the outlet duct 32. Conversely, when the pressure of the fluid in the link duct 142 is less than said threshold value, it generates a force that is less than the force of the spring 145, and the replenishing valve is positioned in its closed configuration, thereby preventing a replenishing flow.

Figure 2A:
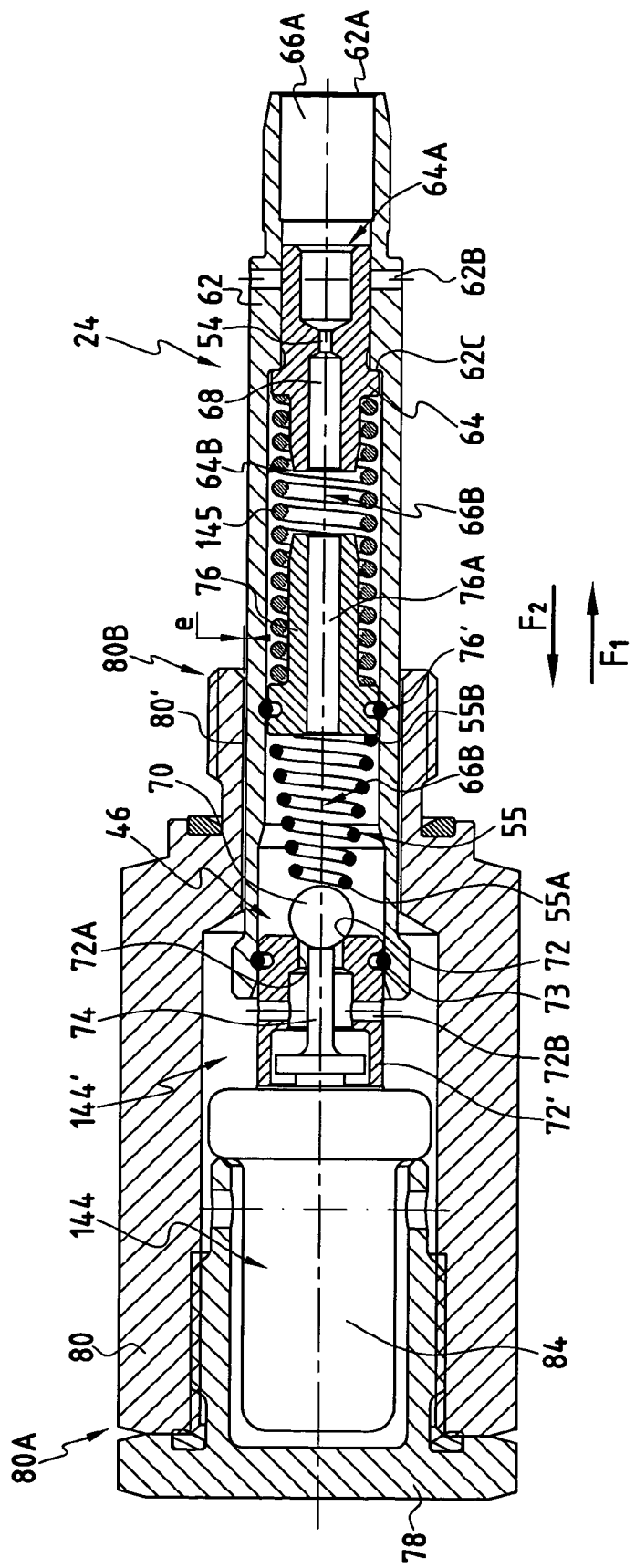
FIG. 2A is a view in longitudinal section of a replenishing valve/control valve assembly in an advantageous embodiment of the invention, in a position that does not make replenishing possible.
Figure 2B:
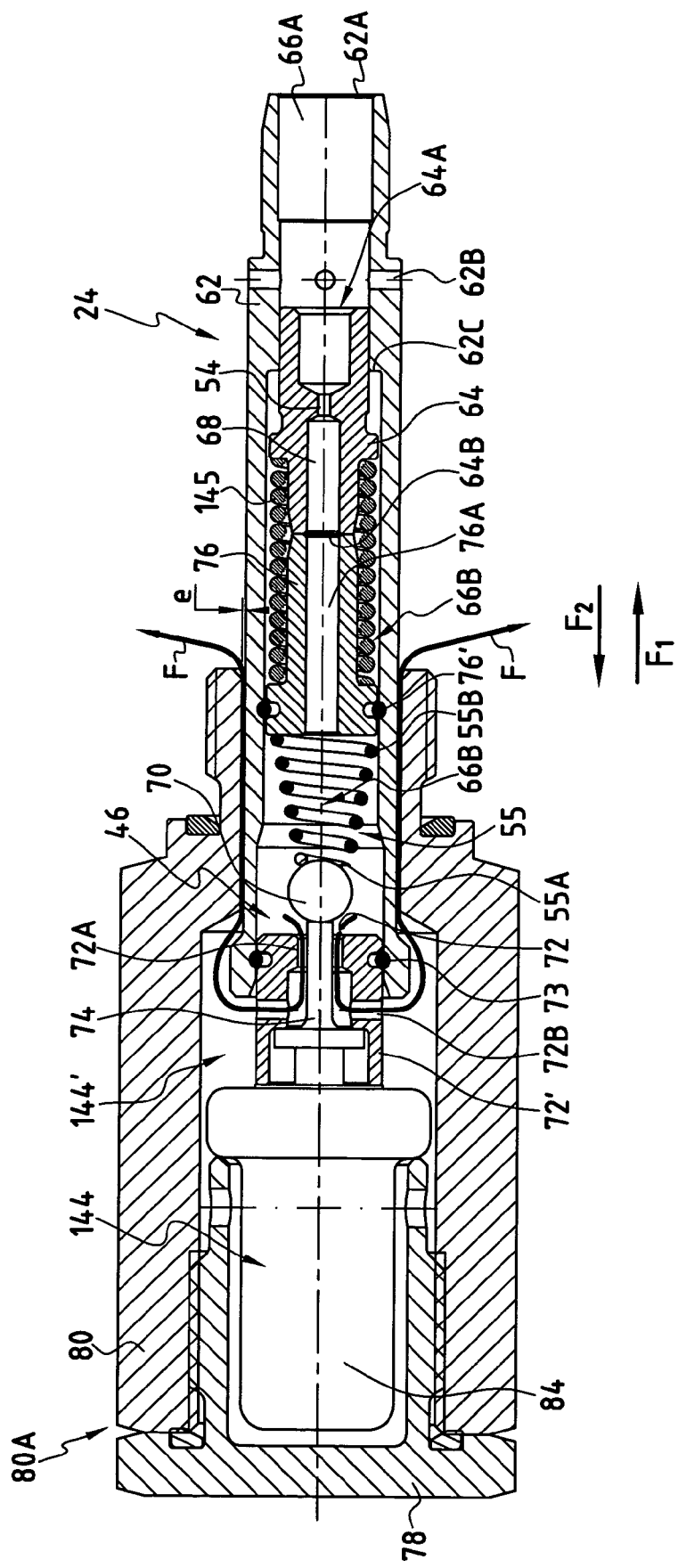
FIG. 2B is a view in section that is analogous to the FIG. 2A view, showing the replenishing valve/control valve assembly in a replenishing position.

FIGS. 2A and 2B show in detail, in one example, a replenishing valve 24 and a control valve 46 of the above-mentioned type.

The replenishing valve 24, shown in the closed position in FIG. 2A, has a valve body 62 provided with an inlet 62A suitable for being connected to one of the main ducts. 12 or 14 or to the duct 22 of FIG. 1, and an outlet 62B suitable for being connected to the pressure-free reservoir 26. The moving member of said replenishing valve 24, which is a valve slide 64 in this example, is mounted to move in the valve body 62 between an open first position in which it isolates the inlet 62A of the replenishing valve 24 from the outlet 62B thereof, and a second position (shown in FIG. 2B) in which it interconnects said inlet 62A and said outlet 62B. The inlet 62A and the outlet 62B of the body 62 form the inlet 24A and the outlet 24B mentioned with reference to FIG. 1.

The spring 145 tends to push the slide 64 against a shoulder 62C formed in the valve body 62 in the direction indicated by the arrow F1 towards its closed position in which it closes off the outlet 62B.

The opening control chamber 66A of the replenishing valve 24 is situated at that end 64A of the slide 64 which is adjacent to the inlet 62A of the valve body 62, whereas the closing control chamber 66B is situated at the other end 64B of said slide 64.

The two control chambers 66A and 66B communicate with each other via a bore in the slide 64, which bore is constituted by a link duct 68. The link duct 68 is provided with the constriction 54 that makes it possible to limit the flow-rate of fluid entering the closing control chamber 66B and thus to generate head loss between the opening chamber 66A and the closing chamber 66B. The duct 68 thus forms the ducts 142, 52A, and 52B mentioned above with reference to FIG. 1.

The control valve 46 includes a control valve member constituted by a ball co-operating with a seat, and which makes it possible to connect the closing control chamber 66B of the replenishing valve 24 to the pressure-free reservoir, or to isolate said chamber 66B from the reservoir. The valve member is constituted by a ball 70 which is disposed in the valve body 62 in a manner such as to be capable of co-operating against a seat 77 forming an abutment secured to the valve body 62. In this example, the seat 72 is formed at the end of a sleeve 72' held stationary in the valve body 62 by a stop bead 73. A rod 74 co-operating with said ball 70 is suitable, as a function of a threshold for the parameter P, for driving the ball 70 in the direction indicated by the arrow F1 so as to lift the ball 70 off its seat 72, while control resilient return means, constituted by the spring 55 in this example, continuously urge the ball 70 in the opposite direction, as indicated by the arrow F2, towards its closed position. The spring 55 is advantageously a conical spring whose top 55A supports the ball 70.

Thus, the ball 70 is in abutment against the top 55A of the spring 55, while the other end 55B of the spring 55, forming its base, is in abutment against an element 76 held stationary in the valve body 62 by a stop bead 76'. Said element 76 is provided with a bore 76A that enables the fluid coming from the link duct 68 to flow to the enclosure that contains the ball 70. As a result, the closing control chamber 66B extends on either side of the bore 76A.

As shown in FIG. 2A, the rod 74 co-operates with a member 84 that is responsive to temperature. In this example, the rod 74 and said member 84 form the actuator 144. The rod 74 can be moved in the direction indicated by arrow F1 or in the direction indicated by F2 as a function of the value of the first control parameter P which, in this case is a temperature measured in a chamber 144', in order to cause the control valve 46 to go between its closed position and its open position. Thus, in this case, the actuator is a heat-responsive element 144 such as a thermal actuator. It can also be an electrical or an electromechanical actuator controlled by an electronic control unit. It should be noted that the chamber 144' is naturally filled with the liquid present in the casing of the motor. The actuator can react to a parameter other than temperature, and in particular other than the temperature of a fluid, e.g. the pressure of fluid in a portion of the circuit other than the main duct that is at the lower pressure, the temperature of the casing of the motor, the active cubic capacity of the motor, etc.).

The actuator 144 is secured to the valve body 62. In this example, it is held against the valve body 62 via the sleeve 72' and via a stopper 78 fastened in leaktight manner in a sheath 80 disposed in the casing of the hydraulic motor (not shown). It can be understood that, at one of the ends 80A, the sheath 80 is closed by the stopper 78, while, at its other end 80B, it is provided with a bore 80' in which the valve body 62 is disposed with clearance e allowing fluid to pass between the enclosure of the casing of the motor and the chamber 144'.

The sleeve 72' is provided with a bore 72A in which the rod 74 is mounted to move, and with a passageway 72B which puts said bore 72A into communication with the chamber 144'. The seat 72 for the ball 70 is situated at the end of the bore 72A that is closer to the closing control chamber 66B, so that the position of the ball 70 prevents the link from being established between the passageway 72B and said chamber 66B or allows said link to be established. The passageway 72B is in communication with the pressure-free reservoir 26 (shown in FIG. 1) via the chamber 144' and via the clearance e existing between the sheath 80 and the valve body 62, making it possible for the fluid contained in the closing control chamber 66B to be discharged to said reservoir, when the ball 70 is lifted off the seat 72 by the rod 74.

Thus, when the ball 70 is held by the spring 55 against the seat 72, the fluid contained in the closing control chamber 66B cannot be discharged to said reservoir, and the forces due to the spring 145 combined with the pressure in said chamber 6B are greater than the forces due to the pressure in the opening control chamber 66A, which leads the slide 64 to be pushed towards its closed position in the direction indicated by arrow F1. Therefore, no link between the inlet 62A and the outlet 62B of the valve body is possible, so that the replenishing cannot take place towards the pressure-free reservoir.

When the temperature of the fluid contained in the chamber 144' reaches a given threshold, the rod 74 moves under the action of the heat-responsive actuator 144, against the spring 55 which compresses, in the direction indicated by arrow F1, thereby lifting the ball 70 off its seat 72, as indicated in FIG. 2B. In which case, the fluid contained in the closing control chamber 66B is discharged via the bore 72A and via the passageway 72B towards the reservoir, as indicated by arrows F.

Therefore, when the pressure at the inlet 62A of the replenishing valve 24 is greater than a given threshold, the forces due to the pressure of the fluid contained in the opening control chamber 66A become greater than the forces due to the spring 145, and due to the pressure in the closing control chamber 66B, so that the slide 64 of the valve that constitutes the replenishing valve 24 is pushed, against the return force of the spring 145 which compresses, towards the replenishing valve open position in the direction indicated by arrow F2, making it possible to connect the inlet 62A of the body 62 of the replenishing valve to the outlet 62B of said body, and thus to allow replenishing to take place towards the pressure-free reservoir. Conversely, when the pressure of the fluid at the inlet 62A is less than said threshold, the return force of the spring 145 is predominant, so that the slide 64 is pushed towards the replenishing valve closed position in the direction indicated by arrow F1, preventing a replenishing flow rate.

Figure 3:
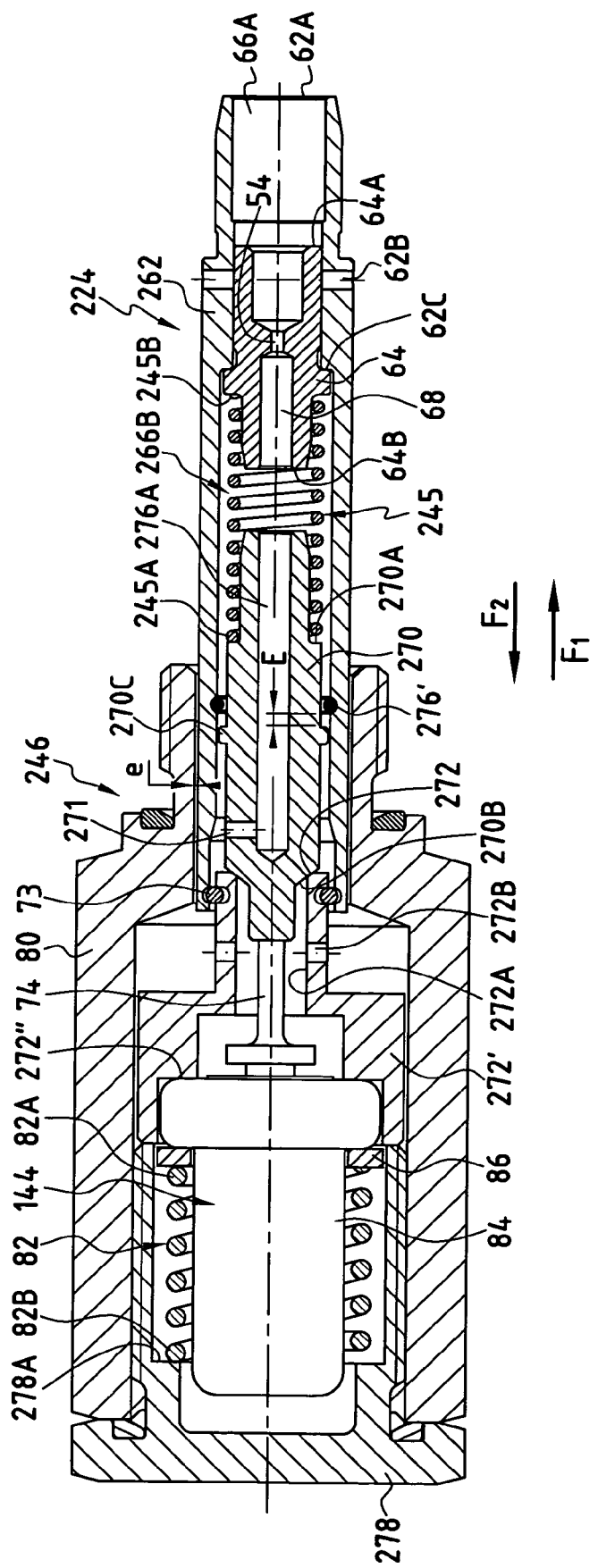
FIG. 3 is a view in section that is analogous to the FIG. 2A view, for a variant.

FIG. 3 shows a variant of the control valve of FIG. 2A in the closed position. The slide 64 and the actuator 144 are identical to the slide and to the actuator that are described above, and they operate in the same manner, so that they are not described in the following description. All of the elements that are common to FIG. 3 and to FIGS. 2A and 2B have the same references as in FIGS. 2A and 2B.

The variant shown in FIG. 3 differs from the variant shown in FIGS. 2A and 2B by the fact that the replenishing return spring making it possible to urge the slide 64 of the replenishing valve 224 and the control return spring are formed by a common spring 245. The assembly comprising the ball 70, the conical spring 55, and a stationary element 76, is, in this variant, replaced with a single moving element 270 which is suitable for moving towards an open position, in the direction indicated by arrow F1, in which position it allows the fluid contained in the closing control chamber 266B to be discharged towards the pressure-free reservoir, or else towards a closed position, in the direction indicated by arrow F2, in which position the fluid in said chamber 266B is isolated from the reservoir. FIG. 3 shows the closed position of the moving element 270.

The moving element 270 has a shoulder 270A against which the spring 245 bears via one of its ends 254A (its other end bearing against the slide 64) and a sealing surface 270B, at the end opposite from the end on which the shoulder 270A is disposed, which sealing surface is suitable for bearing against the seat 272 formed at the end of a sleeve 272' fastened by a stop bead 723 in the valve body 262. The action of said spring 245 and the pressure of the fluid contained in the closing control chamber 266B tend to cause the moving element 270 to move in the direction indicated by arrow F2 towards the control valve closed position.

As in FIGS. 2A and 2B, the sleeve 272' is provided with a passageway 272B making it possible, when the moving element 270 is lifted off the seat 272 by the rod 74 of the actuator 144, to connect the closing control chamber 266B to the bore 272A in the sleeve 272', and thus, by means of the clearance e, to the reservoir.

Thus, as soon as the temperature reaches a given threshold, the rod 74 pushes the moving element 270 towards its open position, in the direction indicated by arrow F1, until a shoulder 270C formed on said element 270 comes into abutment against a bead 276' fastened in the valve body 262. The moving element 270 moving in this way causes the spring 245 to be compressed.

A tapping duct 271 connected to a link duct 276A, both of which are formed in the moving element 270, makes it possible to put the closing control chamber 266B into communication with the pressure-free reservoir via the bore 272A, via the passageway 272B, and via the clearance e that exists between the sheath 80 and the valve body 262.

In the closed position, the shoulder 270C is spaced apart from the bead 276' by a distance E chosen to enable the moving element 270 to move apart from its seat 272 to an extent sufficient to allow the fluid contained in the closing control chamber 266B to be discharged.

Starting from the closed position shown in FIG. 3, operation is as follows. Regardless of the level of the pressure of the fluid in the opening control chamber 66A, the fluid pressures in the chambers 66A and 266B being balanced means that the forces exerted by the spring 245 on the slide 64 constrain said slide to remain stationary. When the slide 74 pushes the moving element 270 slightly in the direction F1, the spring 245 compresses slightly, the pressure in the chamber 266B decreases, and the fluid flows as indicated above. As a result, if the pressure in the chamber 66A is greater than a given threshold, the forces generated by said pressure are greater than the forces generated by the spring 245, and they push the slide 64 in the direction indicated by arrow F2, by compressing the spring 245 further, until the inlet 62A and the outlet 62B of the replenishing valve 62 are put into communication with each other. Conversely, if the pressure of the fluid in the chamber 66A is less than said threshold, the forces of the spring 245 on the slide 64 become predominant and they push the slide towards the closed position, thereby preventing any replenishing flow.

In order to avoid any risk of damage when the control valve 246 Is in the open position, and in order to avoid the need to dimension the surrounding parts very accurately, the body 85 of the actuator 144 can be movably mounted. Thus, a compensation spring 82 can be provided bearing against a cap 278 and against the body 84 of the actuator 144, continuously pushing said body of the actuator against a shoulder 272" on the sleeve 272', and allowing the body 84 of the actuator 144 to move relative to the rod 74. More precisely, said compensation spring 82 bears at one of its ends 82A against a washer 86 which itself bears against the body 84 of the actuator 144, while the other end 82B of the compensation spring bears against a shoulder 278A formed in the cap 278.

Thus, when the control valve 246 is in the open position (not shown in FIG. 3), if the rod 74 has pushed the moving element 270 in the direction indicated by arrow F1, until its shoulder 270C comes into abutment against the bead 276', and when certain conditions (increase in temperature, expansion of parts, etc.) tend to move the rod 74 further out of the body 84, said body takes up the forces and moves against the compensation spring 82 in the direction indicated by arrow F2. Naturally, the compensation spring 82 is compressed less easily than the spring 245.

As indicated above for FIGS. 2A, 2B, and 3, the sheath 80 containing the actuator 144, the control valve and the replenishing valve is fastened, e.g. by screw-fastening, in a bore in the casing of the hydraulic motor. Likewise, the selector 20 can be incorporated into the hydraulic motor, its outlet 22 being connected directly to the inlet 62A of the replenishing valve. In a variant, the same provisions can be applied to the casing of the main feed pump of the hydraulic motor.

The invention claimed is:

1. A replenishing and/or flushing device for a circuit including at least one hydraulic motor having a casing which defines an internal space in which a cylinder block of the motor is disposed, and two main ducts which are connected to a main pump and which constitute respectively a feed main duct and a discharge main duct for said hydraulic motor, the device comprising a replenishing valve connected to at least one of the main ducts and suitable for taking up an open configuration in which said valve establishes a link between said main duct to which said valve is connected and a pressure-free reservoir, and a closed configuration in which the valve prevents such a link from being established, the device further comprising means for causing said replenishing valve to go between the open and the closed configurations as a function of at least one control parameter representing a state of the circuit other than pressure in said main duct to which said replenishing valve is connected, the replenishing valve including a moving member mounted to move between a first position and a second position respectively corresponding to the closed configuration and to the open configuration of the replenishing valve, the device further comprising a control valve which is controlled as a function of said at least one control parameter to allow said moving member to move, said device further comprising an opening control chamber suitable for being connected to one of said main ducts via a first link duct so as to urge the moving member towards the second position thereof in which said main duct is connected to the pressure-free reservoir, and a closing control chamber suitable for being a pressurized enclosure in order to urge the moving member towards the first position thereof, and the control valve being controlled as a function of said at least one control parameter in order to connect said closing control chamber to the pressure-free reservoir or in order to isolate said chamber from said reservoir.

2. A device according to claim 1, wherein said control parameter representing a state of the circuit is chosen from a pressure of the fluid in an auxiliary duct of the circuit, from a temperature of the fluid in a region of the circuit, from a speed of the rotor of the motor, from acceleration or deceleration of said rotor, from an active cubic capacity of the motor, from a turning angle of a vehicle driven by the hydraulic motor, from use of a flow rate delivered by an auxiliary pump for controlling auxiliary equipment, from a direction of drive of the motor, or from a braking situation.

3. A device according to claim 1, provided with an actuator suitable for controlling the control valve as a function of a threshold of said at least one control parameter.

4. A device according to claim 3, wherein the actuator is suitable for controlling the control valve as a function of the temperature in a region of the circuit.

5. A device according to claim 4, further comprising a temperature-responsive member co-operating with said actuator, said member being situated in the vicinity of the casing.

6. A device according to claim 5, provided with a replenishing selector suitable for putting the main duct that is at a lower pressure into communication with the replenishing valve.

7. A device according to claim 6, wherein the opening and closing control chambers are connected to link ducts suitable for being connected via said replenishing selector to the main duct that is at the lower pressure.

8. A device according to claim 1, wherein the closing control chamber is associated with replenishing resilient return means continuously urging said moving member towards its first position.

9. A device according to claim 7, wherein the link duct of the closing control chamber is provided with a constriction.

10. A device according to claim 9, wherein the closing control chamber is connected to the opening control chamber via said constriction.

11. A device according to claim 10, wherein the replenishing valve has a valve body provided with an inlet suitable for being connected to one of the main ducts and with an outlet suitable for being connected to the pressure-free reservoir, the moving member being disposed in said valve body and isolating said inlet from said outlet in the first position thereof, and the moving member connecting inlet to said outlet in the second position thereof, the opening control chamber being situated at an end of the moving member that is in the vicinity of the inlet of the valve body, and the closing control chamber being situated at the other end of said moving member and communicating with the opening control chamber via a bore in the moving, member, in which bore the constriction is disposed.

12. A device according to claim 11, wherein the control valve has a control valve member that is disposed at least in part inside the valve body.

13. A device according to claim 1, wherein the control valve has a control valve member suitable for taking up an open position in which said control valve member connects the closing control chamber to the pressure-free reservoir and a closed position in which said control valve member isolates said chamber from the reservoir.

14. A device according to claim 13, further comprising control resilient return means which continuously urge said control valve member towards its closed position.

15. A device according to claim 3, wherein the control valve has a control valve member suitable for taking up an open position in which said control valve member connects the closing control chamber to the pressure-free reservoir and a closed position in which said control valve member isolates said chamber from the reservoir and wherein that said actuator is suitable for co-operating with the control valve member in order to urge said control valve member towards the open position thereof.

16. A device according to claim 11, wherein at least one of the actuator and the temperature-responsive member are secured to the valve body.

17. A device according to claim 16, wherein at least one of the actuator and the temperature-responsive member is suitable for moving in the valve body, and is urged continuously by resilient return means towards an abutment that is secured to the valve body.

18. A device according to claim 1, wherein the control valve is a progressive valve.

19. A device according to claim 11, wherein said valve body is disposed in a bore in the casing.

20. A device according to claim 1, wherein the replenishing valve has an outlet that is connected to the pressure-free reservoir via the internal space inside the casing.

* * * * *